(12) United States Patent
Mallebrein et al.

(10) Patent No.: US 8,260,525 B2
(45) Date of Patent: Sep. 4, 2012

(54) METHOD AND DEVICE FOR OPERATING AN INTERNAL COMBUSTION ENGINE AND INTERNAL COMBUSTION ENGINE

(75) Inventors: Georg Mallebrein, Korntal-Muenchingen (DE); Michael Frank, Vaihingen/Enz (DE); Alexander Schenck Zu Schweinsberg, Moeglingen (DE); Helerson Kemmer, Vaihingen (DE); Wolfgang Samenfink, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 743 days.

(21) Appl. No.: 12/419,064

(22) Filed: Apr. 6, 2009

(65) Prior Publication Data
US 2009/0265078 A1  Oct. 22, 2009

(30) Foreign Application Priority Data

Apr. 10, 2008  (DE) .......................... 10 2008 001 111

(51) Int. Cl.
*G06F 19/00* (2011.01)
*F02M 51/00* (2006.01)
*F02B 7/04* (2006.01)
*F02D 41/30* (2006.01)

(52) U.S. Cl. .......................... 701/104; 123/295; 123/431

(58) Field of Classification Search ................ 123/27 R, 123/295, 299, 300, 305, 431, 575, 478, 480, 123/486; 701/101–105, 110, 115
See application file for complete search history.

(56) References Cited

U.S. PATENT DOCUMENTS

| | | | | |
|---|---|---|---|---|
| 6,978,762 | B2* | 12/2005 | Mori ............................... | 123/431 |
| 7,237,522 | B2* | 7/2007 | Fukami et al. ............ | 123/184.24 |
| 7,320,297 | B2* | 1/2008 | Kamio et al. ................ | 123/27 R |
| 7,770,561 | B2* | 8/2010 | Kojima et al. ................ | 123/431 |
| 2003/0116107 | A1* | 6/2003 | Laimbock .................. | 123/73 PP |

FOREIGN PATENT DOCUMENTS

| | | | | | |
|---|---|---|---|---|---|
| JP | 01080722 | A | * | 3/1989 | ..................... 123/299 |
| JP | 03003934 | A | * | 1/1991 | ..................... 123/299 |
| JP | 08093599 | A | * | 4/1996 | ..................... 123/299 |

* cited by examiner

*Primary Examiner* — Willis R Wolfe, Jr.
(74) *Attorney, Agent, or Firm* — Kenyon & Kenyon LLP

(57) ABSTRACT

A method and a device for operating an internal combustion engine and an internal combustion engine are described, the fuel being injectable directly into a combustion chamber in particular via at least one first injector and also being injectable into an intake manifold in particular via at least one second injector. For injection of fuel in a full-load operating state of the internal combustion engine, a first selection is made from the at least one first injector and the at least one second injector having a first metering range, including a full-load injection quantity required for the full-load operating state. For injection of fuel in a partial-load operating state of the internal combustion engine, a second selection is made from the at least one first injector and the at least one second injector having a second metering range, including the adjustment of a minimum fuel injection quantity required for operating the internal combustion engine. The first selection and the second selection are made differently, in such a way that only the metering range of the first selection includes the full-load injection quantity and/or that only the metering range of the second selection covers the minimum fuel injection quantity required for operating the internal combustion engine.

13 Claims, 2 Drawing Sheets

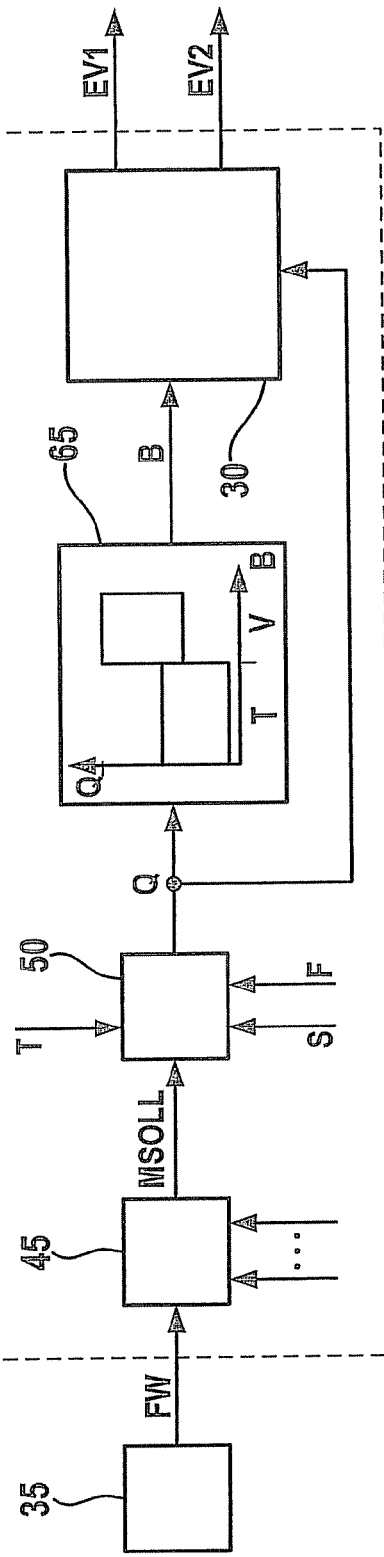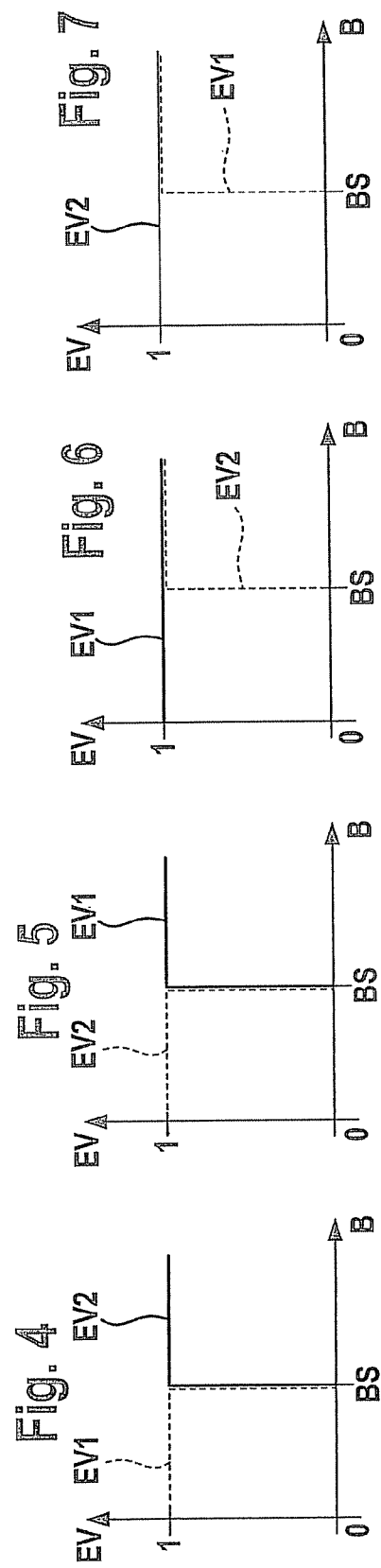

METHOD AND DEVICE FOR OPERATING AN INTERNAL COMBUSTION ENGINE AND INTERNAL COMBUSTION ENGINE

FIELD OF THE INVENTION

The present invention is directed to a method and a device for operating an internal combustion engine as well as being directed to such an internal combustion engine.

BACKGROUND INFORMATION

There are methods and devices for operating an internal combustion engine as well as internal combustion engines in which fuel is injectable directly into a combustion chamber via a first injector as well as into an intake manifold via a second injector. However, an injector for intake manifold injection, in particular a low-pressure injector, and an injector for direct injection, in particular a high-pressure injector, have a limited spread for their metering range, i.e., the injection quantity deliverable per injection stroke. If the metering range for the corresponding injector is designed for maximum fuel demand by the internal combustion engine, e.g., in a full-load operating state, during a cold start of the internal combustion engine or when using a fuel such as ethanol which has a lower calorific value, the minimum quantity of fuel deliverable by the corresponding injector is limited at the lower end by the limited spread of the metering range. This results in restrictions on operation of the internal combustion engine in which very short injection times are required, e.g., in multiple injections and/or at high fuel pressures. Implementation of high tank venting rates is also problematical for the same reason. This is because comparatively small injection quantities for operating the internal combustion engine are required at high tank venting rates.

SUMMARY OF THE INVENTION

The method according to the present invention and the device according to the present invention for operating an internal combustion engine as well as the internal combustion engine having the features of the independent claims have the advantage over the related art that, for injecting fuel in a full-load operating state of the internal combustion engine, a first selection is made from the at least one first injector and the at least one second injector having a first metering range including a full-load injection quantity that is required for the full-load operating state; for injecting fuel in a partial-load operating state of the internal combustion engine, a second selection is made from the at least one first injector and the at least one second injector having a second metering range, including the adjustment of a minimum required fuel injection quantity for operating the internal combustion engine; and the first selection and the second selection are made differently, in such a way that only the metering range of the first selection includes the full-load injection quantity and/or only the metering range of the second selection includes the minimum fuel quantity required for operating the internal combustion engine. In this way, the spread of the metering range for operating the internal combustion engine may be increased and thus the full-load injection quantity as well as the minimum fuel injection quantity required for operating the internal combustion engine may be implemented.

Spreading of the metering range at least in the direction of the minimum fuel injection quantity required in a partial-load operating state of the internal combustion engine is thus achieved through the subject matter of the independent internal combustion engine claim by virtue of the fact that the at least one first injector and/or the at least one second injector has/have a metering range that includes a minimum fuel injection quantity required in partial-load operation and does not include a full-load injection quantity required for full-load operation.

The measures cited in the subclaims permit advantageous refinements and improvements of the method defined in the main claim and of the internal combustion engine defined in the independent internal combustion engine claim.

An internal combustion engine in which only the combination of the at least one first injector and the at least one second injector has a metering range that includes the full-load injection quantity is particularly advantageous. This ensures that the spread in the metering range includes not only the minimum fuel injection quantity required in the partial-load operating state of the internal combustion engine but also the full-load injection quantity without the metering range of any one injector itself having to include the full-load injection quantity. Thus both the at least one first injector and the at least one second injector have a metering range which includes at least the fuel injection quantity required in a partial-load operating state of the internal combustion engine. In this case, the at least one first injector and the at least one second injector have an improved injection performance in the low quantity range.

According to the further features of the method described herein, the following advantages are obtained:

It is advantageous if the first selection is made from only the at least one first injector or only the at least one second injector. This ensures, on the one hand, that there is at least one injector whose metering range includes the full-load injection quantity required for the full-load operating state, so that in the full-load operating state, the required full-load injection quantity may be injected through this injector. On the other hand, however, this also allows at least one injector whose metering range need not include the full-load injection quantity and therefore may be expanded in the direction of the minimum fuel injection quantity required for the partial-load operating state, improved injection performance thus being achievable even in the low quantity range.

Another advantage is obtained when the first selection is made from a combination of the at least one first injector and the at least one second injector. In this way, the metering range of all the injectors may be expanded to the minimum fuel injection quantity required in the partial-load operating state without their metering range having to include the full-load injection quantity required for the full-load operating state, so that all injectors may have an improved injection performance in the low quantity range. Through the combination of the at least one first injector and the at least one second injector in the first selection, it is nevertheless possible to ensure that the full-load injection quantity required for the full-load operating state is achievable through the metering range of this combination.

For this purpose, in the full-load operating state, fuel may also be injected by the at least one first injector as well as by the at least one second injector in an advantageous manner.

It is also advantageous if the second selection is made only from the at least one first injector or only from the at least one second injector. In this way, the minimum fuel injection quantity required for the partial-load operating state is also adjustable with the help of only one single injector whose metering range includes the minimum required full injection quantity. This reduces the complexity for implementation of the minimum required fuel injection quantity.

It is also advantageous that the second selection is made in such a way that it includes at least one injector whose metering range does not include the full-load injection quantity and/or whose steady-state flow rate is reduced in comparison with an injector whose metering range includes the full-load injection quantity. In this way it is possible in a particularly simple and less complex manner to provide an injector for the second selection.

It is also advantageous if the first selection is made in such a way that it includes at least one injector whose metering range includes the full-load injection quantity. In this way the full-load injection quantity is implementable particularly easily and also does not require a combination of multiple injectors.

Exemplary embodiments of the present invention are depicted in the drawings and are explained in greater detail in the following description.

BRIEF DESCRIPTION OF THE DRAWINGS

FIG. 2 shows a function diagram for illustrating the method according to the present invention and the device according to the present invention.

FIG. 4 shows a first diagram for the triggering signals of the injectors as a function of the operating state according to a first example.

FIG. 5 shows a second diagram for the triggering signals of the injectors as a function of the operating state according to a second exemplary embodiment.

FIG. 6 shows a diagram of the triggering signals for the injectors as a function of the operating state according to a third exemplary embodiment.

FIG. 7 shows a diagram for the triggering signals of the injectors as a function of the operating state of the internal combustion engine according to a fourth exemplary embodiment.

DETAILED DESCRIPTION

Figure 1:
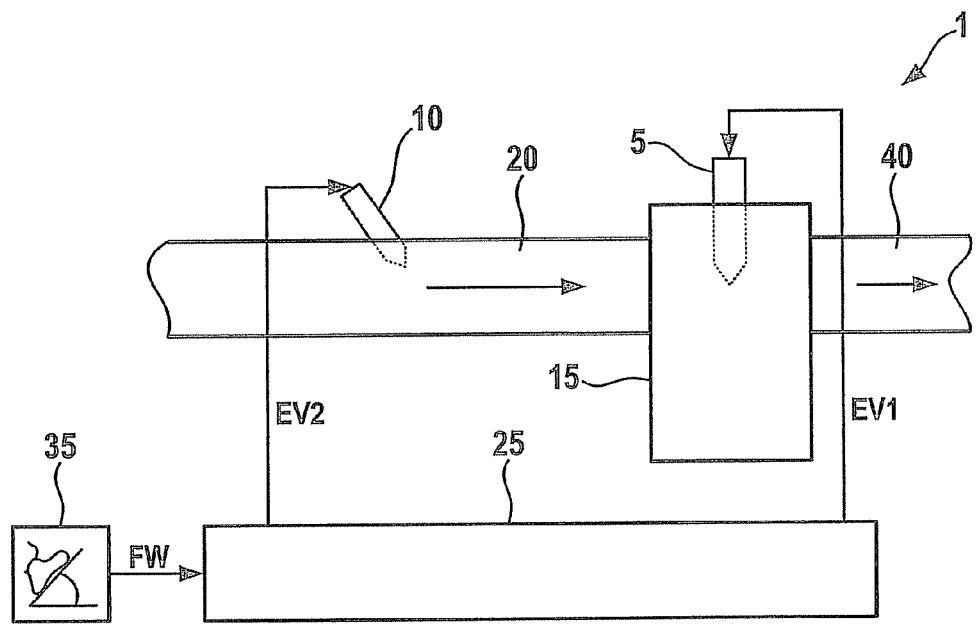
FIG. 1 shows a schematic view of an internal combustion engine.

FIG. 1 shows an internal combustion engine 1. Internal combustion engine 1 is designed here as a gasoline engine, for example, or as a diesel engine. FIG. 1 shows only the elements of internal combustion engine 1 that are essential to the exemplary embodiments and/or exemplary methods of the present invention. For example, internal combustion engine 1 includes at least one cylinder 15, fuel being injected directly into the combustion chamber thereof via a first injector 5. Fresh air is supplied to the combustion chamber of cylinder 15 through an intake manifold 20. Furthermore, a second injector 10 is provided through which fuel is injected into intake manifold 20, and from there reaches combustion chamber 15. The exhaust gas formed during the combustion of the air/fuel mixture in the combustion chamber of cylinder 15 is emitted into an exhaust line 40. Intake valves and exhaust valves of cylinder 15 are not included in FIG. 1 for the sake of simplicity. Likewise, in the case of a gasoline engine, no throttle valve is shown upstream from second injector 10 in intake manifold 20 and no sparkplug is shown for igniting the fuel/air mixture in the combustion chamber of cylinder 15, again for reasons of simplicity. First injector 5 may be, for example, a high-pressure injector. Second injector 10 may be a low-pressure injector, for example. First injector 5 and second injector 10 are each triggered by a device 25 which is formed by the engine controller of internal combustion engine 1, for example. This triggering is accomplished, for example, in a manner known to those skilled in the art, for implementing a desired load, e.g., in the form of a setpoint torque to be implemented or a setpoint power of internal combustion engine 1 to be implemented.

For the case when internal combustion engine 1 drives a motor vehicle, the desired setpoint power or the desired setpoint torque may be predefined by a gas pedal module 35, for example, as a function of the degree of operation of a gas pedal by the driver in the form of a driver's input FW of engine controller 25. Driver's input FW may be expressed, for example, in the form of a driver's input torque or a driver's input power. In addition, other torque requests or power requests may also be taken into account in forming the setpoint torque or the setpoint power, e.g., of vehicle functions such as an electronic stability program, adaptive cruise control, traction control, etc. For the sake of simplicity, it is assumed below that the setpoint torque or the setpoint power is determined only by driver's input FW. Without restricting generality, it is assumed below that driver's input FW is predefined in the form of a torque and thus represents a setpoint torque to be implemented by internal combustion engine 1.

Depending on the desired setpoint torque and/or additional influencing variables, engine controller 25 checks on whether internal combustion engine 1 is to be operated in a partial-load operating state or in a full-load operating state. Depending on this check, engine controller 25 decides whether first injector 5 or second injector 10 or both injectors 5, 10 are to be enabled for implementation of the desired setpoint torque. First injector 5 is enabled by a first enable signal EV1 and second injector 10 is enabled by a second enable signal EV2. For the sake of simplicity, only first enable signal EV1 and second enable signal EV2 are shown in FIG. 1 for triggering injectors 5, 10. In fact, in addition to enabling first injector 5 and enabling second injector 10, however, a desired injection quantity and thus, via the known injection characteristic, the required injection time for implementing the desired injection quantity are also to be taken into account for triggering of injectors 5, 10.

Injection by first injector 5 and second injector 10 is thus a function not only of the desired operating state of internal combustion engine 1 but also of the quantity of fuel to be injected through particular injector 5, 10. As long as first enable signal EV1 has been set, first injector 5 will inject fuel directly into the combustion chamber of cylinder 15. If first enable signal EV1 has been reset, however, first injector 5 does not deliver any fuel. Accordingly, second injector 10 injects fuel into intake manifold 20 as long as second enable signal EV2 has been set. However, if second enable signal EV2 has been reset, then second injector 10 does not deliver any fuel.

The sequence of the method according to the present invention and the structure of the device according to the present invention 25 are explained below on the basis of an example and the function diagram according to FIG. 2. The function diagram of device 25 may be implemented in the software and/or hardware, for example, in the engine controller of internal combustion engine 1. Device 25 may be formed by the engine controller, as described above, but only the elements of engine controller 25 that are crucial for the exemplary embodiments and/or exemplary methods of the present invention are shown in the form of a function diagram in FIG. 2.

Device 25 includes a receiving unit 45, which receives driver's input FW from gas pedal module 35. Receiving unit 45 may also receive requests regarding the setpoint torque to be implemented by internal combustion engine 1 from other vehicle functions, as indicated in FIG. 2. All requests are then converted by receiving unit 45 into a resulting setpoint torque MSETPOINT to be implemented in a manner known to those skilled in the art, e.g., by torque coordination. This resulting setpoint torque MSETPOINT is sent in a manner likewise known to those skilled in the art to a so-called fuel path 50 which converts the resulting setpoint torque MSETPOINT into a quantity of fuel Q to be injected. Fuel path 50 optionally receives information S indicating whether internal combustion engine 1 has currently been started as a function of, e.g., an ignition lock being operated, as well as a temperature signal T, which is representative of the internal combustion engine temperature and is ascertained by a cooling water temperature sensor, for example.

If internal combustion engine temperature T is below a predefined threshold value and if an instantaneous start of internal combustion engine 1 is detected by signal S, then a cold start of internal combustion engine 1 is detected and quantity of fuel Q to be injected is set at a full-load injection quantity $Q_V$ regardless of resulting setpoint torque MSETPOINT. The threshold value for ascertaining the cold start may be calibrated on a test bench and/or in driving tests.

The same happens when the resulting setpoint torque MSETPOINT assumes a value that is characteristic of the full-load operating state of internal combustion engine 1, e.g., when the accelerator pedal is fully depressed. Furthermore, a signal F about the type of fuel and/or grade of fuel currently being used is optionally sent to fuel path 50. The type of fuel currently being used may be ascertained in a manner known to those skilled in the art. In the case of a fuel having a lower calorific value, e.g., ethanol, full-load injection quantity $Q_V$ may also be requested by fuel path 50. The existence of a cold start or a fuel having a lower calorific value in comparison with a reference fuel may be analyzed in fuel path 50 in a manner known to those skilled in the art and therefore will not be explained in greater detail here.

Fuel quantity Q to be injected, as ascertained in fuel path 50, is supplied to a characteristic curve 65 representing the relationship between fuel quantity Q to be injected and instantaneous operating state B of the internal combustion engine. Characteristic curve 65 is explained in greater detail below on the basis of FIG. 3. Depending on fuel quantity Q to be injected, characteristic curve 65 ascertains particular prevailing operating state B of the internal combustion engine and forwards it to a selection unit 30. Selection unit 30 then forms first enable signal EV1 as a function of instantaneous operating state B of the internal combustion engine and forms second enable signal EV2, as described according to FIGS. 4 through 7 as an example.

Figure 3:
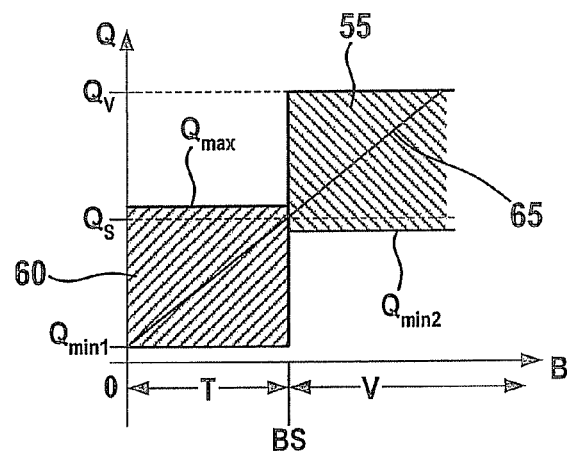
FIG. 3 shows a diagram of the fuel injection quantity as a function of the operating state of the internal combustion engine.

FIG. 3 shows characteristic curve 65 in greater detail, where fuel quantity Q to be injected is plotted as a function of instantaneous operating state B of internal combustion engine 1.

Characteristic curve 65 shows a partial-load operating state T of internal combustion engine 1 for fuel quantity Q to be injected below a predefined threshold value $Q_S$. However, for required injection quantities Q above predefined threshold value $Q_S$, characteristic curve 65 indicates the presence of a full-load operating state V of internal combustion engine 1. Thus according to FIG. 3, full-load operating state V of internal combustion engine 1 is assumed for required fuel injection quantities Q greater than predefined threshold value Qs even if required injection quantity Q does not yet correspond to full-load injection quantity $Q_V$. In full-load operating state V of internal combustion engine 1, a first selection is made by selection unit 30 from first injector 5 and second injector 10 having a first metering range, also including maximum full-load injection quantity $Q_V$ required for the full-load operating state, whereas for the injection of fuel in partial-load operating state T, a second selection is made by selection unit 30 from first injector 5 and second injector 10 having a second metering range, including setting a minimum fuel injection quantity $Q_{min1}$ required for operating internal combustion engine 1. The first metering range is labeled with reference numeral 55, as shown with hatching in FIG. 3. The second metering range is labeled with reference numeral 60 and is shown in FIG. 3 with hatching opposite that of first metering range 55.

It is found here that the first selection and the second selection are made differently by selection unit 30, in such a way that only the first metering range includes maximum required full-load injection quantity $Q_V$ and only the second metering range includes minimum fuel injection quantity $Q_{min1}$ required for operation of internal combustion engine 1. The first metering range in the example in FIG. 3 extends from a second minimum value $Q_{min2}$ to maximum required full-load injection quantity $Q_V$, and the second metering range extends from minimum required fuel injection quantity $Q_{min1}$ to a maximum value $Q_{max}$. According to FIG. 3, $Q_{min1} < Q_{min2} < Q_{max} < Q_V$.

Predefined threshold value Qs is thus ideally within range $Q_{min2} \leq Q_S \leq Q_{max}$. This ensures that a selection from first injector 5 and second injector 10 may be made by selection unit 30 for each fuel quantity Q to be injected, the metering range of this selection allowing implementation of fuel quantity Q to be injected instantaneously.

According to an alternative specific embodiment, it may also be provided that selection unit 30 makes the first selection and the second selection differently, so that only the metering range of the first selection includes full-load injection quantity $Q_V$ or only the metering range of the second selection includes minimum fuel injection quantity $Q_{min1}$ required for operating the internal combustion engine. However, it should be ensured on the whole that the first metering range is able to implement all injection quantities Q to be injected for a full-load operating state V and that the second metering range is able to implement all fuel quantities Q to be injected for partial-load operating state T.

In the diagram in FIG. 3, the boundary between partial-load operating state T and full-load operating state V is represented by threshold BS, which is obtained by assigning fuel quantity Q to be injected to predefined threshold value Qs via characteristic curve 65.

According to a first specific embodiment, the first selection is made by selection unit 30 only from first injector 5. In this example, the second selection is made only from second injector 10. This means that the first metering range is the metering range of first injector 5 and the second metering range is the metering range of second injector 10. The second metering range of second injector 10 may be shifted toward lower fuel quantities Q to be injected in comparison with the first metering range of first injector 5, in such a way that the metering range of second injector 10 no longer includes full-load injection quantity $Q_V$ because $Q_{max} < Q_V$. This may be accomplished, for example, by reducing the steady-state flow of second injector 10 in comparison with the steady-state flow of first injector 5, so that the characteristic curve of second injector 10, as the relationship between injection time and injection quantity, thus has a flatter slope than the characteristic curve of first injector 5. According to FIG. 5, which shows enable signals EV1, EV2 as a function of instantaneous operating state B of internal combustion engine 1, then in partial-load operating state T≦BS, only second injector 10 is provided for injection by setting second enable signal EV2 and resetting first enable signal EV1, whereas in full-load operating state V>BS, only first injector 5 is enabled for fuel injection by setting first enable signal EV1 and resetting second enable signal EV2.

According to a second specific embodiment, the first selection is made only from second injector 10 and the second selection is made only from first injector 5, the resulting case being the opposite of that in the first exemplary embodiment. Now the first metering range corresponds to the metering range of second injector 10, and the second metering range corresponds to the metering range of first injector 5. Thus, in partial-load operating state T≦BS, only first injector 5 is enabled by setting first enable signal EV1 and resetting second enable signal EV2, whereas in full-load operating state V>BS, only second injector 10 is enabled by setting second enable signal EV2 and resetting first enable signal EV1.

In this case, the metering range of first injector 5 does not include full-load injection quantity $Q_V$, e.g., by reducing its steady-state flow rate in comparison with second injector 10, the metering range of which includes full-load injection quantity $Q_V$.

In a third specific embodiment according to FIG. 6, the first selection by selection unit 30 is made from a combination of first injector 5 and second injector 10. The second selection, however, is made only from first injector 5. Thus, first metering range 55 is obtained by combining the fuel injection of first injector 5 and that of second injector 10. Second metering range 60 is then the metering range of first injector 5. First injector 5 is thus enabled in the partial-load operating state and also in the full-load operating state according to FIG. 6, and first enable signal EV1 is set in both operating states.

However, second injector 10 is enabled only in full-load operating state V and second enable signal EV2 is thus set only in full-load operating state V.

In a fourth specific embodiment according to FIG. 7, as in the third specific embodiment, the first selection is again made by a combination of first injector 5 and second injector 10, but the second selection is made only from second injector 10. Thus, in the fourth specific embodiment, second metering range 60 corresponds to the metering range of second injector 10. Thus, in the fourth exemplary embodiment according to FIG. 7, second enable signal EV2 is set in the partial-load operating state and also in the full-load operating state, whereas first enable signal EV1 is set only in the full-load operating state.

Thus, in the third exemplary embodiment and in the fourth exemplary embodiment, fuel is injected both by first injector 5 and by second injector 10 in the full-load operating state.

In the first specific embodiment, the metering range of first injector 5 includes full-load injection quantity $Q_V$ and in the second exemplary embodiment, the metering range of second injector 10 includes full-load injection quantity $Q_V$. All exemplary embodiments have in common the fact that at least one of injectors 5, 10 has a metering range that includes at least minimum fuel injection quantity $Q_{min1}$ required for operating internal combustion engine 1 in the partial-load operating state and does not include full-load injection quantity $Q_V$ required in the full-load operating state and is formed, e.g., according to second metering range 60 with $Q_{min1} \leq Q \leq Q_{max} < Q_V$. Furthermore, exemplary embodiments 3 and 4 illustrate a case in which only the combination of first injector 5 and second injector 10 has a metering range in the form of first metering range 55, which includes full-load injection quantity $Q_V$. In the third and fourth specific embodiments, it is also possible for each of injectors 5, 10 to have second metering range 60, first metering range 55 being obtained by the combination of the two injectors in the full-load operating state. For example, in this case $Q_{min2}=2*Q_{min1}$ and $Q_V=2*Q_{max}$.

In this case, both injectors 5, 10 thus have an improved injection performance in the low quantity range, specifically in the range of minimum required fuel injection quantity $Q_{min1}$. According to the second exemplary embodiment, second injector 10, i.e., the low-pressure injector in intake manifold 20, is designed to cover full-load injection quantity $Q_V$, and first injector 5, i.e., the high-pressure injector, is designed to cover minimum required fuel injection quantity $Q_{min1}$. A high flexibility is advantageous here in implementing multiple direct injections by first injector 5 at high pressures, at which only a small injection quantity in the range of minimum required fuel injection quantity $Q_{min1}$ is necessary.

On the whole, the exemplary embodiments and/or exemplary methods of the present invention allows relaxation of manufacturing tolerances for first injector 5 and second injector 10 because the particular metering range may be smaller and need not cover the entire range from minimum required fuel injection quantity $Q_{min1}$ up to full-load injection quantity $Q_V$. Furthermore, the achievable tank venting rate may be increased, so that tank venting may be carried out in the first exemplary embodiment with operation of only second injector 10 in the partial-load operating state. This retains a robustness with respect to knocking at full load and increased charge through direct injection.

If using multiple intake manifold injectors and/or multiple direct injectors, the method described here may be further improved because first metering range 55 may be provided by the injection by more than two injectors. Furthermore, in this way second metering range 60 may be shifted further in the direction of smaller minimum required fuel injection quantities because the spread of the metering range of the individual injectors may be even smaller than when using two injectors.

In the case of the third exemplary embodiment and the fourth exemplary embodiment according to FIG. 6 and FIG. 7, both injectors 5, 10 may also each have a metering range according to second metering range 60 and thus do not deliver full-load injection quantity $Q_V$ by themselves. In this case, the first metering range may also go up to a value greater than full-load injection quantity $Q_V$ with the combination of both injectors 5, 10, so that only values up to full-load injection quantity $Q_V$ are called up.

Selection unit 30 then delivers enable signals EV1, EV2 according to the particular exemplary embodiment according to FIG. 4, FIG. 5, FIG. 6 or FIG. 7 for the required injection time for implementing fuel quantity Q to be injected, depending on operating state B supplied according to characteristic curve 65. For this purpose, fuel quantity Q of fuel path 50 to be injected is also supplied to selection unit 30. Outside of the required injection time, enable signals EV1, EV2 are set at zero in general and are thus reset. The injection time required for implementing fuel quantity Q to be injected is ascertained with the help of the characteristic curves of injectors 5, 10 in selection unit 30 in a manner known to those skilled in the art. These characteristic curves are stored in selection unit 30. Fuel quantity Q to be injected may be distributed uniformly or differently between both injectors 5, 10. It is also possible to start intake manifold injection sooner than direct injection, for example, so that the fuel thereby delivered may reach the combustion chamber of cylinder 15 in time for combustion.

The present invention was described above on the basis of the use of a single cylinder 15 and may be applied to multiple cylinders similarly, second injector 10 possibly also being assigned to multiple cylinders for which fuel is delivered by second injector 10 at different times.

According to an alternative specific embodiment, first injector 5 and second injector 10 may be designed as direct injectors and may inject fuel directly into the combustion chamber of cylinder 15. Alternatively, first injector 5 and second injector 10 may both be designed as intake manifold injectors and may inject fuel through intake manifold 20 into the combustion chamber of cylinder 15 or of the cylinders.

What is claimed is:

1. An internal combustion engine, comprising:
    at least one first injector via which fuel is injectable; and
    at least one second injector via which fuel is injectable;
    wherein at least one of the at least one first injector and the at least one second injector has a metering range which includes a minimum fuel injection quantity required for operating the internal combustion engine in a partial-load operating range and does not include a full-load injection quantity required in a full-load operating state, and
    wherein only the combination of the at least one first injector and the at least one second injector has a metering range that includes the full-load injection quantity.

2. A method for operating an internal combustion engine in which fuel is injectable both via at least one first injector, and via at least one second injector, the method comprising:
    selecting, for injecting the fuel in a full-load operating state of the internal combustion engine, in a first selection from the at least one first injector and the at least one second injector having a first metering range that includes a full-load injection quantity required for the full-load operating state; and
    selecting, for injecting the fuel in a partial-load operating state of the internal combustion engine, in a second selection from the at least one first injector and the at least one second injector having a second metering range that includes the setting of a minimum fuel injection quantity required for operating the internal combustion engine;
    wherein the first selection and the second selection are made differently so that at least one of (i) only the metering range of the first selection includes the full-load injection quantity, and (ii) only the metering range of the second selection includes the minimum fuel injection quantity required for operating the internal combustion engine, and
    wherein the first selection is made from a combination of the at least one first injector and the at least one second injector.

3. The method of claim 2, wherein in the full-load operating state, fuel is injected both by the at least one first injector and by the at least one second injector.

4. A device for operating an internal combustion engine, in which fuel is injectable both via at least one first injector, and via at least one second injector, comprising:
    a selection arrangement including:
        a first selection arrangement for injecting fuel in a full-load operating state of the internal combustion engine by making a first selection from the at least one first injector and the at least one second injector having a first metering range that includes a full-load injection quantity required for the full-load operating state;
        a second selection arrangement for injecting fuel in a partial-load operating state of the internal combustion engine, by making a second selection from the at least one first injector and the at least one second injector having a second metering range that includes the adjustment of a minimum fuel injection quantity required for operating the internal combustion engine; and
    a triggering device that triggers the at least one first injector and the at least one second injector at a setpoint toque or a setpoint power;
    wherein the selection arrangement makes the first selection and the second selection differently so that at least one of (i) only the metering range of the first selection includes the full-load injection quantity, and (ii) only the metering range of the second selection includes the minimum fuel injection quantity required for operating the internal combustion engine.

5. The device of claim 4, wherein the fuel is injectable via the at least one first injector directly into a combustion chamber, and via the at least one second injector into an intake manifold.

6. An internal combustion engine, comprising:
    at least one first injector via which fuel is injectable;
    at least one second injector via which fuel is injectable; and
    a triggering device that triggers the at least one first injector and the at least one second injector at a setpoint toque or a setpoint power;
    wherein at least one of the at least one first injector and the at least one second injector has a metering range which includes a minimum fuel injection quantity required for operating the internal combustion engine in a partial-load operating range and does not include a full-load injection quantity required in a full-load operating state.

7. The internal combustion engine of claim 6, wherein the fuel is injectable via the at least one first injector directly into a combustion chamber, and via the at least one second injector into an intake manifold.

8. A method for operating an internal combustion engine in which fuel is injectable both via at least one first injector, and via at least one second injector, the method comprising:
    selecting, for injecting the fuel in a full-load operating state of the internal combustion engine, in a first selection from the at least one first injector and the at least one second injector having a first metering range that includes a full-load injection quantity required for the full-load operating state;
    selecting, for injecting the fuel in a partial-load operating state of the internal combustion engine, in a second selection from the at least one first injector and the at least one second injector having a second metering range that includes the setting of a minimum fuel injection quantity required for operating the internal combustion engine; and
    triggering the at least one first injector and the at least one second injector by a triggering device through a setpoint toque or a setpoint power;
    wherein the first selection and the second selection are made differently so that at least one of (i) only the metering range of the first selection includes the full-load injection quantity, and (ii) only the metering range of the second selection includes the minimum fuel injection quantity required for operating the internal combustion engine.

9. The method of claim 8, wherein the first selection is made only from the at least one first injector or only from the at least one second injector.

10. The method of claim 8, wherein the second selection is made only from the at least one first injector or only from the at least one second injector.

11. The method of claim 8, wherein the second selection is made so that it includes at least one injector for which at least one of the following is satisfied: its metering range does not include the full-load injection quantity, and its steady-state flow rate is reduced in comparison with an injector whose metering range includes the full-load injection quantity.

12. The method of claim 8, wherein the first selection is made so that it includes at least one injector whose metering range includes the full-load injection quantity.

13. The method of claim 8, wherein the fuel is injectable via the at least one first injector directly into a combustion chamber, and via the at least one second injector into an intake manifold.

* * * * *